Sept. 20, 1971     C. E. GAMBALE     3,605,527
METHOD FOR MANUFACTURING HIP REAMERS
Filed June 3, 1969     11 Sheets-Sheet 1
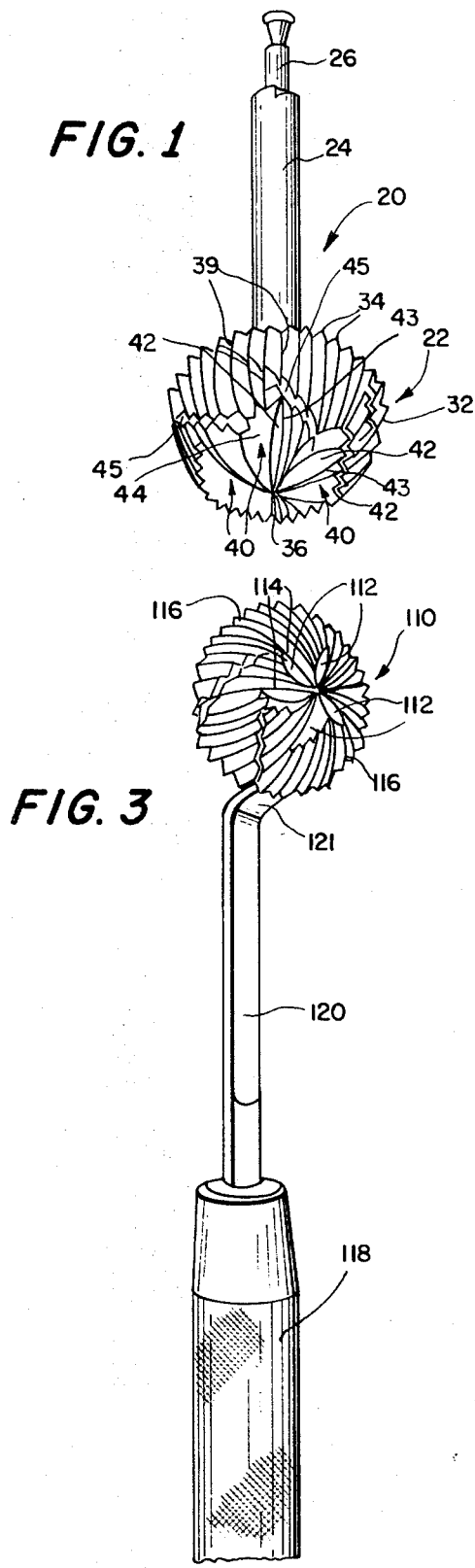
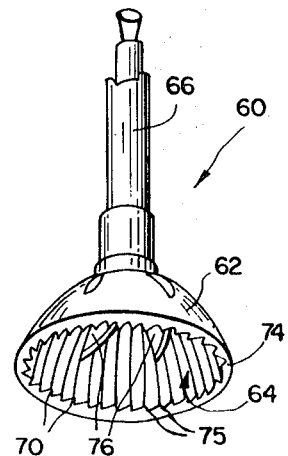
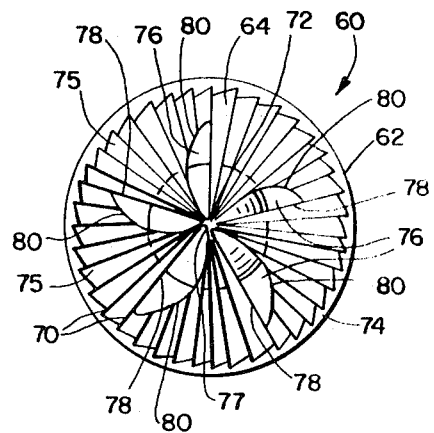
INVENTOR
CHARLES E. GAMBALE
BY *Shapiro and Shapiro*
ATTORNEYS Sept. 20, 1971 C. E. GAMBALE 3,605,527
METHOD FOR MANUFACTURING HIP REAMERS
Filed June 3, 1969 11 Sheets-Sheet 2

INVENTOR
CHARLES E. GAMBALE

BY *Shapiro and Shapiro*

ATTORNEYS

Sept. 20, 1971        C. E. GAMBALE        3,605,527
METHOD FOR MANUFACTURING HIP REAMERS
Filed June 3, 1969        11 Sheets-Sheet 3

INVENTOR
CHARLES E. GAMBALE

BY   *Shapiro and Shapiro*

ATTORNEYS

Sept. 20, 1971                C. E. GAMBALE                3,605,527
              METHOD FOR MANUFACTURING HIP REAMERS
Filed June 3, 1969                            11 Sheets-Sheet 6
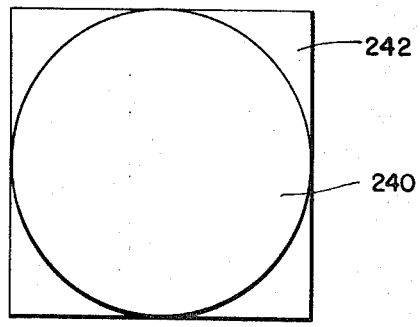
FIG. 17
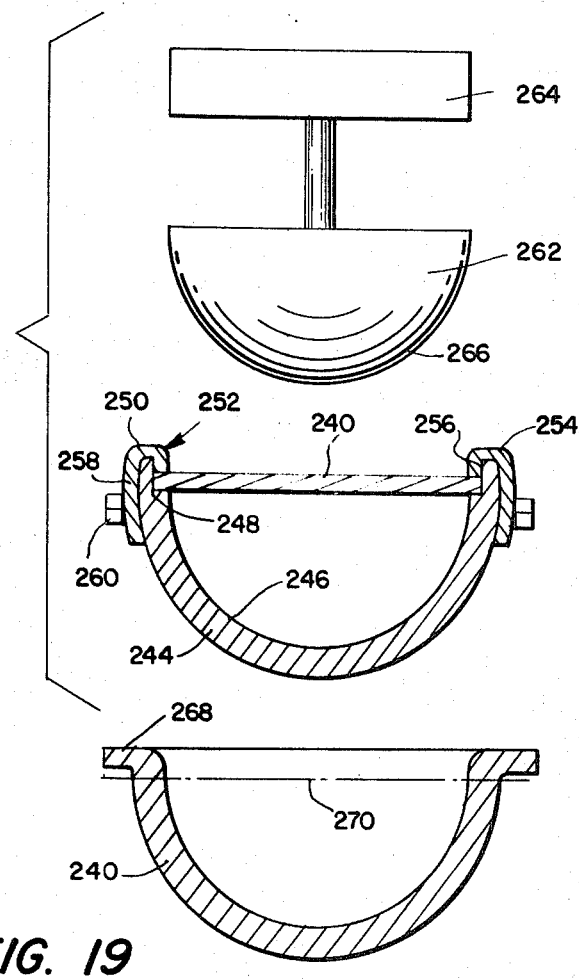
FIG. 18
FIG. 19
INVENTOR
CHARLES E. GAMBALE
BY  *Shapiro and Shapiro*
ATTORNEYS Sept. 20, 1971      C. E. GAMBALE      3,605,527
METHOD FOR MANUFACTURING HIP REAMERS
Filed June 3, 1969      11 Sheets-Sheet 7

INVENTOR
CHARLES E. GAMBALE

BY *Shapiro and Shapiro*

ATTORNEYS

Sept. 20, 1971    C. E. GAMBALE    3,605,527
METHOD FOR MANUFACTURING HIP REAMERS
Filed June 3, 1969    11 Sheets-Sheet 9

INVENTOR
CHARLES E. GAMBALE

BY *Shapiro and Shapiro*

ATTORNEYS

Sept. 20, 1971                    C. E. GAMBALE                    3,605,527
                       METHOD FOR MANUFACTURING HIP REAMERS
Filed June 3, 1969                                              11 Sheets-Sheet 10
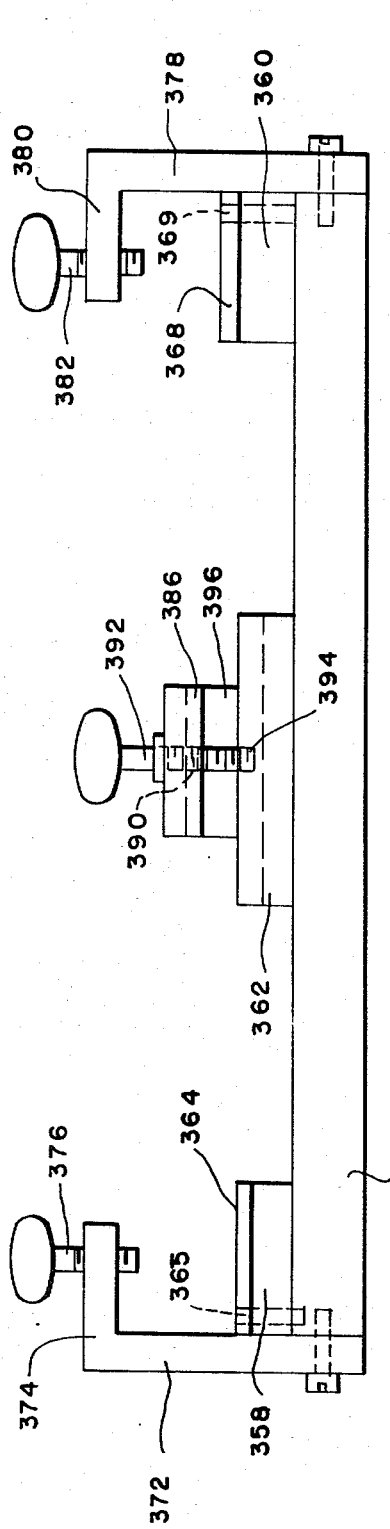
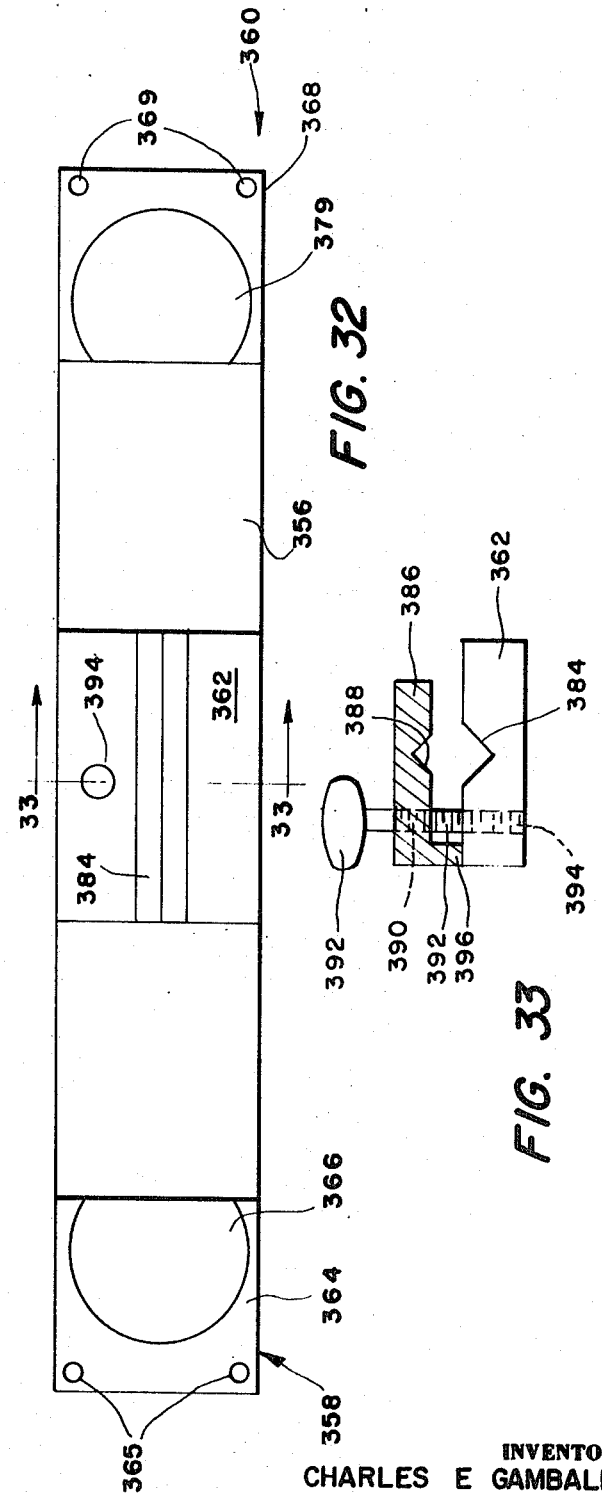
INVENTOR
CHARLES E GAMBALE
BY *Shapiro and Shapiro*
ATTORNEYS

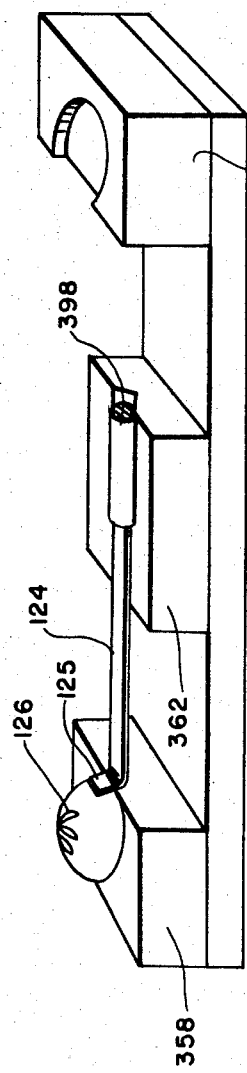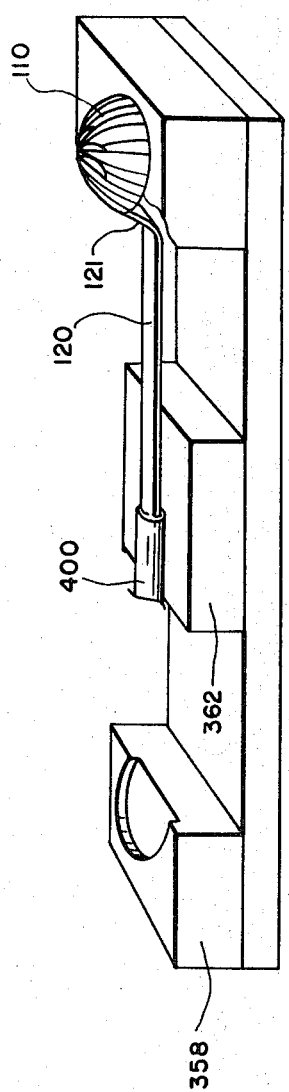

United States Patent Office 3,605,527
Patented Sept. 20, 1971

3,605,527
METHOD FOR MANUFACTURING HIP REAMERS
Charles E. Gambale, East Boston, Mass., assignor to Gambale and Merrill Corporation, Boston, Mass.
Filed June 3, 1969, Ser. No. 830,046
Int. Cl. B21k *21/00*
U.S. Cl. 76—101A
11 Claims

ABSTRACT OF THE DISCLOSURE

Methods and apparatus are disclosed for manufacturing reamers for use in hip arthroplasty. A solid-type, center-cutting acetabular reamer is made by: milling a piece of cylindrical stock to a spherical dome; cutting recesses adjacent to the apex of the reamer by moving the dome-shaped blank rectilinearly into a frusto-conical rotary cutter having a flat upper surface which is located in the plane of, but offset from, the centerline of the dome-shaped blank; cutting radial teeth by engaging the blank with a rotary cutter and moving the blank in an arcuate path while in engagement with the rotary cutter; cutting chip-breaker grooves by moving the blank in an arc while in engagement with a rotating saw blade while the blank is tipped upwardly at an angle; and threadedly securing a shaft to a threaded boss provided on the rear side of the blank and welding it thereto with the use of special welding rig. Fenestrated head and acetabulum reamers are provided from a dome-shaped spherical blank which is formed by cold-pressing a circular blank by means of a spherical male die member and a spherical female die member. This blank is then squared off and placed in a special collet for rectilinear movement into engagement with frusto-conical cutting means which cuts openings adjacent to the center of the blank. In the case of head reamers, the blank is then provided with internal radial teeth by tipping it upwardly at an angle while it is held in a special collet and moving it rectilinearly into engagement with a frusto-conical rotary cutter. A concentric shaft may then be welded to the outer surface of the blank by the use of a special welding rig. Eccentric handles may also be welded to the peripheral edge of the blank by employing a special welding rig.

FIELD OF THE INVENTION

This invention relates to methods and apparatus for manufacturing surgical tools and, more particularly, to methods and apparatus for manufacturing hip reamers of the center-cutting type.

BACKGROUND OF THE INVENTION

Dr. William H. Harris has recently disclosed center-cutting reamers for use in hip arthroplasty. Acetabular reamers are disclosed having an outer dome-shaped, spherical surface provided with a plurality of recesses forming aggressive cutting edges adjacent the apex of the surface and radial peripheral teeth extending inwardly from a smooth peripheral edge. Femoral head reamers are disclosed which have an inner dome-shaped surface similarly provided with a plurality of recesses or openings forming aggressive cutting edges adjacent the apex of the surface and peripheral teeth extending inwardly from a smooth peripheral edge. The reamers are disclosed as having concentric power drive shafts or eccentric handles for the application of hand power.

Since the hip reamers disclosed by Dr. Harris are intended for use in surgical procedures, it is of considerable importance that they be manufactured to precise specifications. It is, for example, necessary that the outer surfaces of the acetabulum reamers and the inner surfaces of the head reamers be substantially spherical and concentric so that the acetabulum and the femoral head be accurately provided with concentric surfaces to fit with a concentric hip cup. It is also necessary that the aggressive cutting edge provided by the central recesses or fenestrations be truly congruent with the arcuate profile of the active surface of the reamer. In like manner, it is important that the radial, peripheral teeth also be congruent with the arcuate profile of the active surface of the reamer and be formed by grooves extending inwardly from the outer peripheral edge becoming shallower as they approach the apex of the active surface. In the case of the acetabulum reamers, it is necessary to provide grooves for facilitating the elimination of clogging by bone chips, these grooves extending across the center and peripheral teeth at an angle. In the case of the power-driven reamers, it is of some importance that the drive shafts be concentric with the active spherical surfaces of the reamers. In the case of the hand-driven eccentric reamers, it is necessary that the handles be secured thereto with some accuracy.

These requirements for the hip reamers as disclosed by Dr. Harris application present substantial problems in their manufacture. In the prior art, it has been the custom to manufacture hip reamers of earlier forms primarily by a plurality of hand operations, including, for example, considerable hand filing. Due to the complexity of the active surfaces of Dr. Harris' reamers and the necessity to comply with the aforementioned specifications, this would be a most difficult and onerous task if accomplished primarily by hand.

SUMMARY OF THE INVENTION

It is, accordingly, the principal object of the present invention to provide methods of manufacturing acetabulum and femoral head reamers of the center-cutting type.

It is an additional object of the present invention to provide methods for manufacturing hip reamers of the aforementioned character by a plurality of primarily machine operations.

It is a further object of the invention to provide special apparatus for accurately shaping a blank to a spherical surface, for holding blanks for machine operations, and for accurately welding shafts or handles to the cutting heads of the hip reamers.

Briefly, in the case of solid acetabular reamers having an active outer surface, a piece of cylindrical stock is provided and shaped to a spherical surface by mounting it for rotation in a horizontal milling machine while a cutting blade is moved in an arc about the center of the desired spherical surface, the cutting blade being fed manually toward this center. The blank is then mounted with its central axis horizontal and its outer spherical surface facing a rotating frusto-conical cutting blade having a flat upper surface, the flat upper surface being located in the plane of, but offset from, the center line of the blank. The blank is then reciprocated into engagement with the cutting blade which cuts the center recesses. The blank is then indexed by rotating it about its axis so that a plurality of such center cuts may be formed. The blank is then mounted in a similar fashion and moved in an arc while in engagement with a smaller rotating cutting bade of the same configuration to cut the radial peripheral teeth. In the next step, the blank is again mounted for arcurate movement while in engagement with a rotating saw blade, while tipped upwardly at an angle of approximately 30 degrees, to cut the chip-breaker grooves. A shaft having a threaded stud is then engaged with a threaded boss provided on the back side of the blank and welded thereto by use of a special welding rig to be described hereinbelow.

In the case of fenestrated reamers, a circular blank is placed over a female die member of spherical configuration by resting it upon shoulders provided about the peripheral edge of the female die member. The female die member also has an upstanding lip surrounding the shoulder upon which it is placed a special clamping ring which engaged and retains the blank against the shoulder. A male die member of similar spherical configuration is then hydraulically forced into the female die member to cold-form the blank into the form of a substantialy spherical dome-like cup. The resulting peripheral flange on the blank is cut off, and the edge squared. The blank is then placed in a special collet with its outer surface facing outwardly and tipped downwardly at an angle of approximately 30 degrees and rectilinearly moved into engagement with a frusto-conical rotary cutter rotating about a vertical axis and engaging the blank adjacent to the apex thereof. The axis of the blank is also, in this operation, out of alignment with the shaft of the rotary cutter. The blank is then placed in a special collet with its inner surface facing outwardly and is tipped upwardly at an angle of approximately 15 degrees. It is then moved rectilinearly into engagement with a frusto-conical rotary cutter rotating about a vertical axis which cuts a radial tooth extending almost to the apex of the inner surface.

In the case of power driven head reamers, a concentric shaft is then welded to the outer surface by use of a special welding ring to be described hereinbelow. In the case of eccentric handle head and acetabular reamers, a different special welding rig is employed for securing the handles to the peripheral edge of the respective reamer head.

Special collets are provided for holding the cup-like blank for the aforementioned center cutting and radial teeth cutting operations. In the first case, where the outer surface of the cup-like blank faces the cutter, a flat annular bearing surface is provided with a rim engaging the outer peripheral edge of the blank. The collet has radial slots which extend inwardly and then backwardly along a hollow shaft extending from the back surface thereof to provide resiliency to the collet. The shaft has a tapered portion whereby the resilient collet may be received in a tapered opening so as to cause the collet to tightly grip the blank. In the second case, the collet has a spherical surface to receive the outer surface of the blank with the inner surface facing the cutting tool. Similar slots and a similar tapered portion are provided for causing the collet to tightly grip the blank.

The special welding rigs include in the case of the attachment of a concentric shaft, a base plate having a recess for receiving either the apex, in the case of the acetabular reamer, or the peripheral edge, in the case of the head reamer, of the reamer head. A V-groove is provided above and in alignment with the axis of the head for maintaining the shaft in alignment and concentric with the axis of the head while it is welded. In the case of the eccentric handles, three pedestals are provided at different elevations. The end pedestals have arcuate recesses to receive the edges of a reamer head, while a central pedestal includes clamping means for gripping the shaft of the handle, the other end of which is held in engagement with either the peripheral edge or the outer surface of the reamer for the welding operation.

The foregoing and other objects, advantages, and features of the invention and the manner in which the same are accomplished will become more readily apparent upon consideration of the following detailed description of the invention when taken in conjuction with the accompanying drawings, which illustrate preferred and exemplary embodiments.

BRIEF DESCRIPTION OF THE DRAWINGS

FIG. 1 is a perspective view of an acetabular reamer to be manufactured in accordance with the present invention;

FIG. 2 is an end view of a head reamer to be manufactured in accordance with the present invention;

FIG. 2A is a perspective view of the reamer of FIG. 2;

FIG. 3 is a perspective view of an acetabular reamer of the eccentric type to be manufactured in accordance with the present invention;

FIG. 17 is a plan view showing the manner in which a circular blank used in the method of the invention is provided;

FIG. 18 is a schematic diagram, corresponding to a plan view, illustrating a step of the invention;

FIG. 19 is a section view, showing a blank of the invention, after the step of FIG. 18 has been completed;

FIG. 31 is a side elevation view of an additional embodiment of welding rig according to the invention;

FIG. 32 is a plan view of the welding rig of FIG. 31 with certain parts removed;

FIG. 33 is a section view taken along the line 33—33 of FIG. 32;

DETAILED DESCRIPTION OF THE PREFERRED EMBODIMENTS

Figure 4:
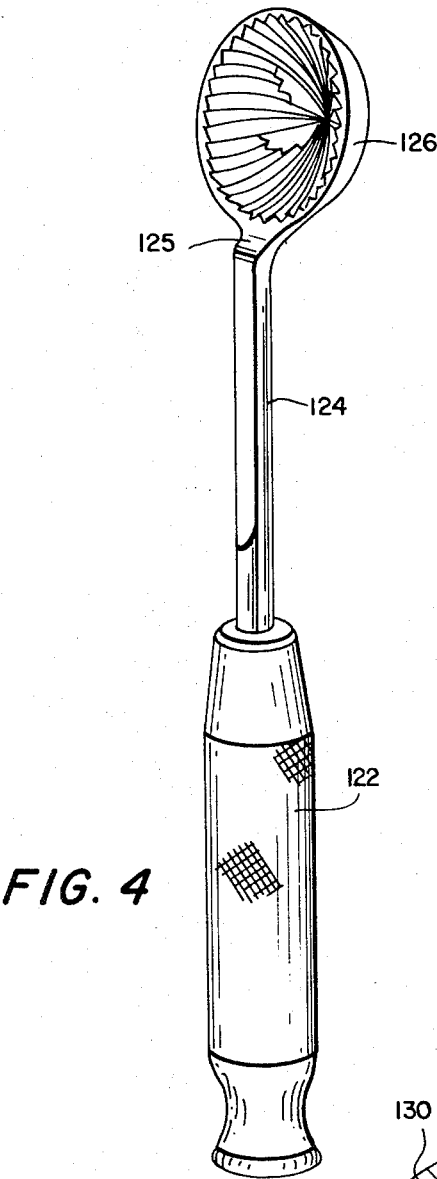
FIG. 4 is a perspective view of a head reamer of the eccentric type to be manufactured in accordance with the present invention.

The principal purpose of the method and apparatus of the present invention is the manufacture of hip reamers useful in hip arthroplasty as disclosed by Dr. William H. Harris. Turning to FIG. 1 it will be seen that an acetabular reamer 20 as disclosed by Dr. Harris comprises a cutting head 22 and a concentric drive shaft 24, which may be connected to a power drive unit by means of a coupling 26. The outer surface 32 of head 22 is dome-shaped, substantially spherical, and arcuate in profile. A plurality of peripheral cutting teeth 34 extend radially inwardly from the peripheral edge of the head to the center, or apex, 36 of the dome-shaped surface. The teeth 34 are formed by a plurality of grooves 39 which become shallower as the grooves approach the apex 36 and are congruent with the arcuate profile of surface 32. In order to provide deep-cut aggressive center-cutting teeth, a plurality of recesses 40 are provided adjacent to the apex 36. These recesses are formed with a substantially flat radial wall 42, providing an aggressive cutting edge 43 congruent with the arcuate profile of the surface 32, and an arcuate wall 44. In addition, chip-breaker grooves 45 are provided at an angle to teeth 34 as means for disposing of bone chips which would otherwise clog the teeth. The outer peripheral edge of head 22, which is not shown in this figure, is substantially flat and smooth.

Referring to FIGS. 2 and 2A, which show a femoral head reamer 60 as disclosed by Dr. Harris, it will be noted that the reamer includes a substantially dome-shaped, cup-like head 62 having an inner dome-shaped, spherical surface 64, arcuate in profile, and a concentric drive shaft 66 extending from the outer surface of cutting head 62. Inner surface 64 is provided with a plurality of peripheral cutting teeth 70, congruent with the arcuate profile of surface 64, and extending inwardly to the center, or apex, 72 from the outer peripheral edge 74, which is flat and smooth, of head 62. Teeth 70 are formed by grooves 75 of decreasing depth from the outer edge 74. So as to provide aggressive cutting means near the apex of head 62, a plurality of openings 76 are provided. These openings meet at a small bridge portion 77 and each have a first substantially radially extending edge 78 and a second arcuate edge 80. Edges 78 form deep-cut aggressive central cutting teeth congruent with the arcuate profile of surface 64. At least one of these edges is aligned with one of the peripheral teeth 70 to form a continuous aggressive cutting edge to the outer peripheral edge 74.

FIG. 3 illustrates another embodiment of center-cutting acetabular reamer as disclosed by Dr. Harris. The reamer includes a head 110 resembling the head of the reamer of FIG. 1 with the exception that the openings 112 are cut through the head, which is formed as a cup-like shell. These openings provide the central deep-cut, aggressive, substantially radial cutting edges 114, congruent with the arcuate profile of the outer surface. Peripheral teeth 116 are provided extending radially inwardly from the outer smooth edge. At least one of these peripheral teeth is aligned with at least one of the cutting edges 114 to form a continuous cutting edge to the peripheral edge. An eccentric handle 118 is connected to the periphery of head 110 by a connecting shank portion 120 having an angled end portion 121. This angled end portion, as will be presently explained, has its end welded to the edge of head 110.

FIG. 4 illustrates another embodiment of head reamer as disclosed by Dr. Harris. In this case the reamer has a cup-like head 126 which generally resembles the cutting head of the head reamer as shown in the embodiment of FIGS. 2 and 2A. An eccentric handle 122 is connected by a connecting shank portion 124 to the peripheral edge of head 126. Connecting portion 124 includes an angled end portion 125 which is welded to the outer surface of head 126 so that connection 124 appears to be extending from the peripheral edge of head 126. Due to the fact that the angled end 125 is welded to the outer surface of head 126 the connecting portion 124 is closer to alignment with the peripheral edge of head 126 than is the connecting portion 120 of the embodiment shown in FIG. 3.

Figure 5:
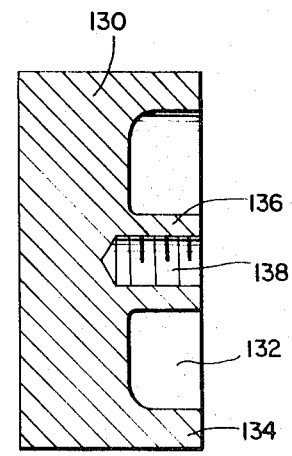
FIG. 5 is a section view, taken along the lines 5—5 of FIG. 6, of a blank to be employed in the method of the present invention.
Figure 6:
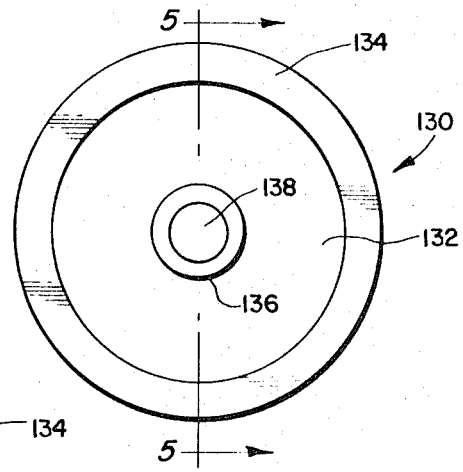
FIG. 6 is an end view of the blank of FIG. 5, as viewed from the left.
Figure 9:
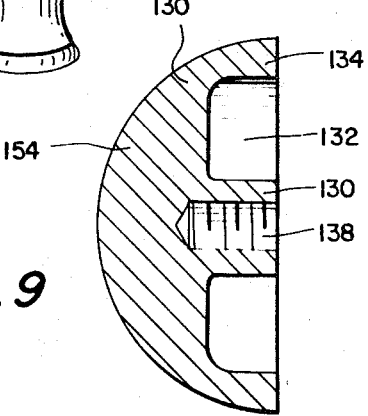
FIG. 9 is a section view, showing the blank of FIG. 5 after the operation of FIGS. 7 and 8.

Turning now to the method of manufacturing the acetabular reamer of FIG. 1, there is first provided a solid cylindrical blank 130 as shown in FIGS. 5 and 6. This blank may be formed by cutting a piece of desired length from cylindrical stock of the desired diameter. This piece is then turned on a lathe to provide an annular well 132 between an outer peripheral flange 134 and an inner central boss 136. The boss is provided, by means of a thread tapping operation, with a threaded hole 138 concentric with the center of the blank.

Figure 7:
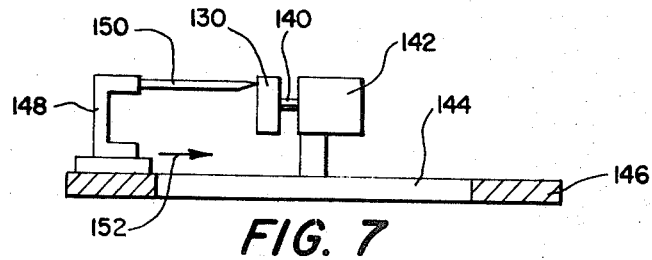
FIG. 7 is a schematic diagram, corresponding to an elevation view, illustrating a step of the invention.
Figure 8:
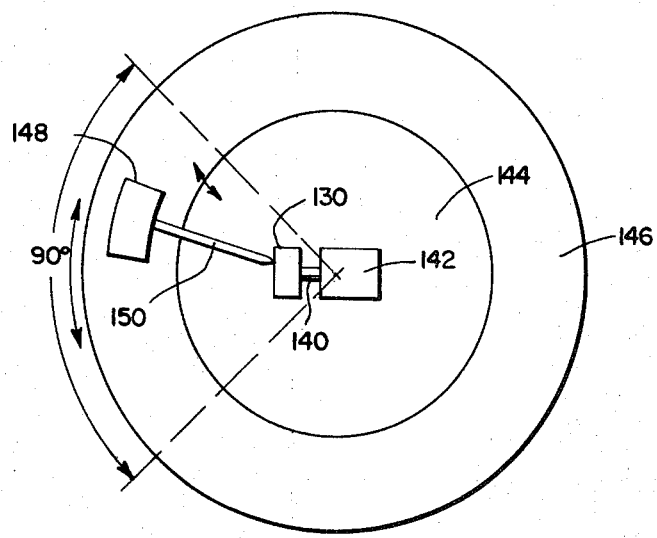
FIG. 8 is a schematic diagram, corresponding to a plan view, of the step of FIG. 7.

Turning to FIGS. 7 and 8, it will be seen that the blank 130 is now mounted for rotation about a horizontal shaft 140 driven by a drive unit 142 of a horizontal milling machine. The drive unit 142 is fixedly mounted on a fixed table 144 surrounded by a rotating turntable 146 upon which is mounted a holder 148 for a carbide cutting blade 150. As indicated by arrow 152, holder 148 is adapted to be manually fed rectilinearly toward the center of rotation of turntable 146. The blank 130 is mounted with respect to the center of rotation of the turntable 146 so that a spherical surface may be cut contiguous to the back edge of flange 134 and concentric with the center of rotation of table 146. In order to cut this surface, the rotating table 146 is oscillated back and forth over an arc of 90 degrees to cut metal from the rotating blank 130. After each cut, cutter blade 150 is advanced toward the center of rotation of table 146 by controlling the manual feed. This is continued until the blank is shaped with a substantially spherical, dome-shaped outer surface 154, which is arcuate in profile.

Figures 10, 10A:
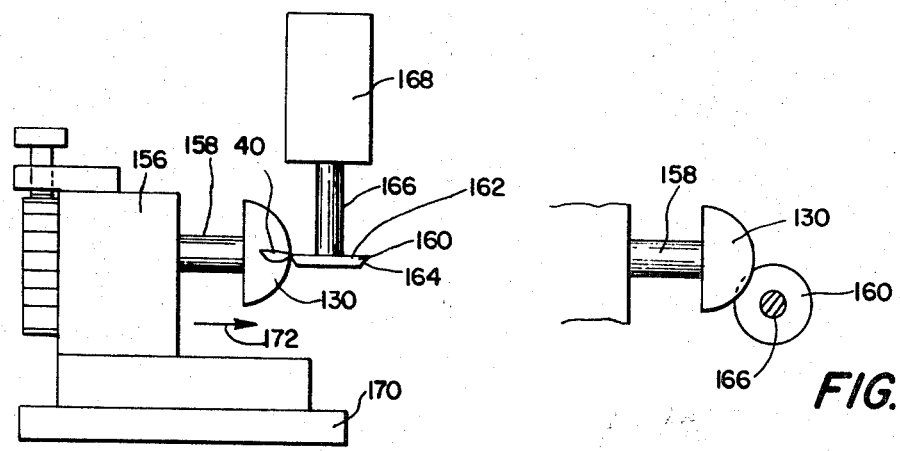
FIG. 10 is a schematic diagram, corresponding to an elevation view, showing an additional step of the invention.
FIG. 10A is a schematic diagram, corresponding to a partial plan view, of the step of FIG. 10.

The blank 130 is now in condition to have the central recesses 40 (see FIG. 1) cut therein. To this end, as shown in FIGS. 10 and 10A, the blank 130 is mounted with its axis horizontal in an indexing head 156 of a vertical milling machine. Head 130 is secured to a mounting shaft 158 by means of a spring-loaded annular collet (not shown) positioned in well 132 and bearing against flange 134 and boss 136. The blank 130 is rotated about the axis of shaft 158 to a particular position at which it is desired to cut a recess 40. In order to effect the cut, a frusto-conical cutting implement 160 is provided. Cutting implement 160 has a flat upper surface 162 and a frusto-conical cutting face 164 provided with cutting teeth and disposed at an angle of substantially 60 degrees with the horizontal. The cutting implement 160 is mounted for rotation about a vertical shaft 166 driven by a drive unit 168 with its upper surface 162 in the same plane as the axis of blank 130. Referring to FIG. 10A, it will be seen that, viewed from above, the shaft 166 of cutter 160 is offset from the axis of blank 130. The index head 156 is now reciprocated along a base 170, as indicated by arrow 172, to bring the surface of blank 130 into engagement with the cutter 160 as shown in FIG. 10A. By this operation, the recess 40 is cut into the surface of blank 130. By virtue of the flat upper surface 162 of cutter 160, the flat wall 42 (see FIG. 1) is cut, this wall providing the deep-cut aggressive center-cutting teeth of the acetabular reamer. After one of the recesses is so cut, the index head is caused to reciprocate away from the cutter. The blank 130 is then indexed by rotation about shaft 158 to a new position and again reciprocated into engagement with cutter 160. Five or six recesses, depending upon the size of the reamer, are thus cut at equal angular positions about the apex of blank 130.

Figure 11:
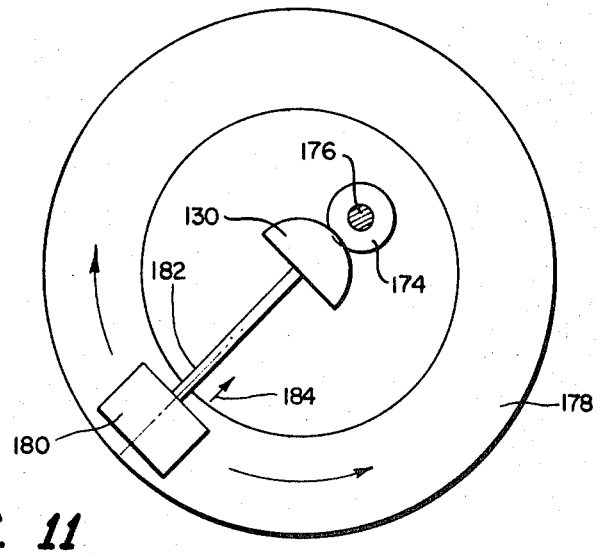
FIG. 11 is a schematic diagram, corresponding to a plan view, showing an additional step of the invention.

The blank is now ready for the cutting of the radial peripheral teeth. This is accomplished in a vertical milling machine as shown in FIG. 11. A frusto-conical rotary cutting implement 174 of smaller diameter than the cutting implement of FIG. 10 is mounted for rotation about a vertical shaft 176 and driven by a drive unit (not shown). The cutting implement 174 has a frusto-conical cutting face and a flat upper surface, the cutter generally resembling the cutting implement of FIG. 10. Shaft 176 is located above a space within and concentric with a revolving turntable 178 upon which is mounted an index head 180. Blank 130 is mounted on a mounting shaft 182 of index head 180 by means of a suitable spring-loaded collet (not shown). It will be noted that the axis of blank 130 is placed slightly out of alignment with axis of rotation of the table. This will enable grooves to be cut radially of the surface of blank 130 which are deepest at the peripheral edge and which become shallower as the grooves approach the apex of the blank. As indicated by arrow 184, the blank 130 is reciprocated into engagement with cutter 174. The table 178 is then moved in an arc with blank 130 in engagement with cutter 174, enabling cutter 174 to cut a groove 39 thus forming one of the radial teeth 34 (see FIG. 1). The blank 130 is then reciprocated away from the cutter and indexed by rotation about shaft 182 to the next position of a groove 39. The process is then repeated by reciprocating the blank into engagement with the cutter and again moving the blank 130 in an arc about the cutter. These steps are repeated until all of the radial teeth 34 are cut through the surface of blank 130.

Figure 12:
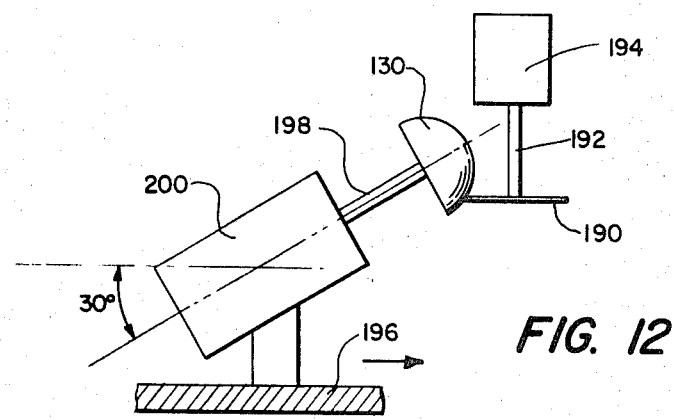
FIG. 12 is a schematic diagram, corresponding to an elevation view, showing an additional step of the invention.
Figure 13:
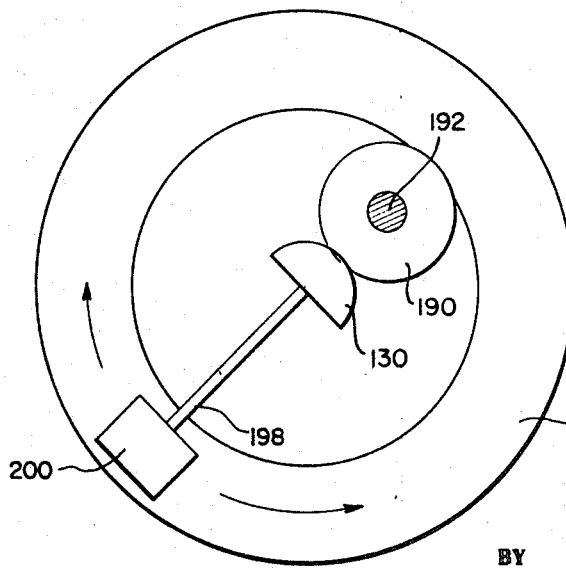
FIG. 13 is a schematic diagram, corresponding to a plan view, showing the step of FIG. 12.

The blank 130 is now ready to have the grooves 45 cut therein. This is accomplished in the manner shown in FIGS. 12 and 13. A rotary saw blade 190 is mounted for rotation about a vertical shaft 192 driven by a drive unit 194. As shown in FIG. 13, shaft 192 is mounted above a space within and concentric to a rotary turntable 196 mounted for rotation thereabout. The blank 130 is mounted by means of a suitable collet (not shown) to a mounting shaft 198 of an index head 200, which is tipped upwardly at an angle of 30 degrees. After blank 130 is indexed by rotation about shaft 198 to the desired position for groove 45, it is reciprocated into engagement with rotary saw blade 190 and then moved in an arc while in engagement with rotary saw blade 190, as shown in FIG. 13. This results in the cutting of one of the grooves 45. The index head is then reciprocated away from the saw blade 190 and indexed to the next position for a groove 45. The process is then repeated until all of the grooves 45 have been cut.

Figure 14:
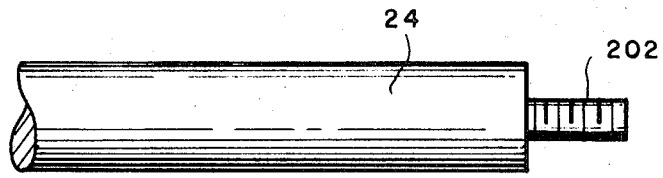
FIG. 14 is a view, partly broken away, showing a portion of a drive shaft of a reamer made according to the present invention.
Figure 15:
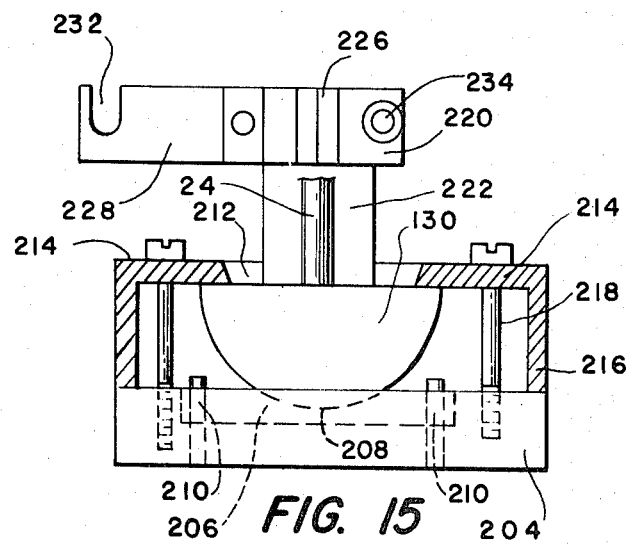
FIG. 15 is an elevation view showing one embodiment of a welding rig employed in the method of the invention.
Figure 16:
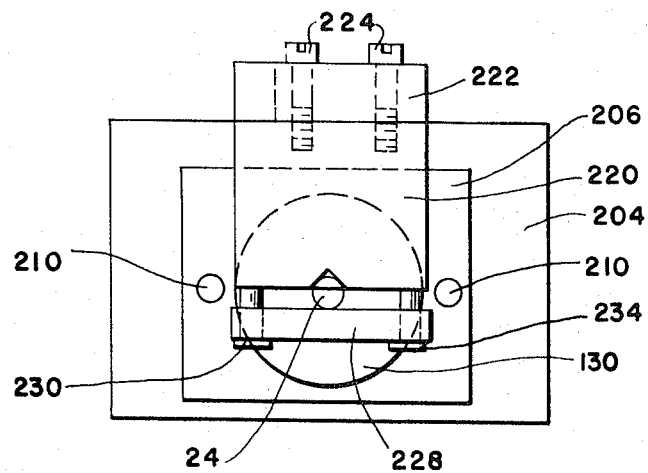
FIG. 16 is a plan view of the welding rig of FIG. 15.

The blank 130 is now ready for the attachment of the shaft 24 which, as shown in FIG. 14, is provided with a threaded stud 202 at one end. This stud is threadedly engaged in threaded hole 138 of blank 130 and welded thereto by employing the welding rig of FIGS. 15 and 16.

The welding rig includes a base 204 having a recess to receive a base plate 206 which is provided with a spherical depression 208 complementary to the spherical surface of blank 130. Base plate 206 is provided with a pair of holes so that it may be dropped on a pair of pins 210 which extend upwardly from base 204. In order to maintain the alignment of blank 130, it fits beneath a circular opening 212 provided in a plate 214, which bears against the smooth peripheral edge of blank 130. The plate has a peripheral flange 216 so that it is spaced above base 204, being secured thereto by a pair of screws 218. It is to be noted that plate 214 and screws 218 have been omitted from the view of FIG. 16 for the sake of clarity.

In order that shaft 24 is held in true concentricity to the spherical surface of blank 130, a guide block 220 is mounted on a vertical standard 222 extending upwardly from base 204 and is secured thereto by a pair of screws 224. Guide block 220 has a V-groove 226 positioned to receive shaft 24 in alignment with the central axis of blank 130. In order to clamp shaft 24 into V-groove 226, a clamping bar 228 is provided. This bar is pivoted on a pin 230 and has a slot 232, which when put into the closed position, engages a bolt 234. Clamping bar 228 is shown in its open position in FIG. 15, and in its closed position in FIG. 16. The welding rig is mounted for rotation so that the welder can weld around the shaft to weld it to boss 136.

The manufacture of the reamer is now complete except for finishing polishing and the like.

Turning now to the manufacturing procedure for making the embodiments of reamers shown in FIGS. 2, 3 and 4, as shown in FIG. 17 a circular blank 240 is cut from a square plate of stainless steel 242 of the desired thickness. This may be accomplished by using a lathe. The disc 240 is now polished on flat surfaces to remove all burrs or rough edges.

The blank 240 is now ready to be formed into a cup-shaped body in the manner illustrated in FIG. 18. A female die member 244 is provided having an inner spherical surface 246 with the desired spherical curvature of the completed reamer head. Die member 244 has an annular shoulder 248 surrounded by a peripheral upstanding lip 250. The blank 240 is positioned over the female die member 244 with its outer peripheral edge resting on shoulder 248. A clamping ring 252 has an annular groove 254 which fits over upstanding lip 250. An inner depending flange 256 of ring 252 bears against the upper surface of blank 240 to secure it in position. In order to maintain ring 252 on female die member 244, it has a depending outer flange 258 bearing against the outer surface of the female die member. A spring retaining ring 260 may be positioned about flange 258 to retain ring 252 upon die member 244.

A male die member 262 is mounted on a hydraulic press 264 and has an outer spherical surface 266 having the same spherical curvature as female die member 244. The press 264 will typically be of sufficient capacity to provide a pressure of 75 tons per square inch. A drawing compound oil is coated in the female die member and the male die member is lowered in the die by the use of a hydraulic pump, building up a pressure from 20 to 30 tons per square inch. If the blank was one-eighth thick to begin with, the cold-forming process shaping the blank as the male die member enters the female die member will result in a thickness of 0.120 inch at the apex and a thickness of 0.135 inch at the point of greatest diameter.

The blank 240 will now be cup-shaped as shown in FIG. 19, having inner and outer spherical surfaces and a peripheral flange 268. This flange is then cut off in a lathe along line 270 with the peripheral edge provided being squared off and smooth.

The blank 240 is now ready for the cutting of the central fenestrations or openings. In the case of the acetabular reamer of FIG. 3, these openings are cut in the same manner as the cutting of the recesses of the acetabular reamer of FIG. 1, as illustrated in FIGS. 10 and 10A and as described hereinabove. The cutting of the radial teeth and the grooves of the reamer of FIG. 3 will also follow the method employed and described hereinabove with respect to the acetabular reamer of FIG. 1. These steps are illustrated in FIGS. 11, 12 and 13.

Figure 20:
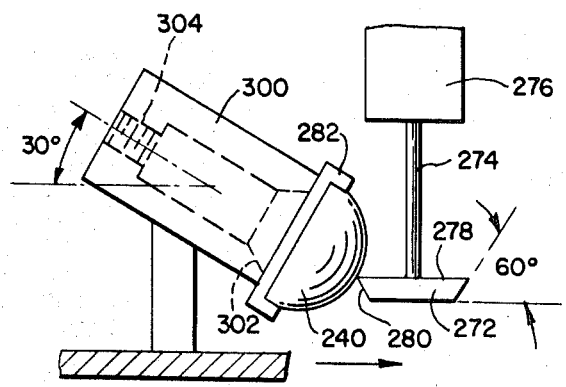
FIG. 20 is a schematic diagram, corresponding to an elevation view, illustrating a step of the invention.
Figure 21:
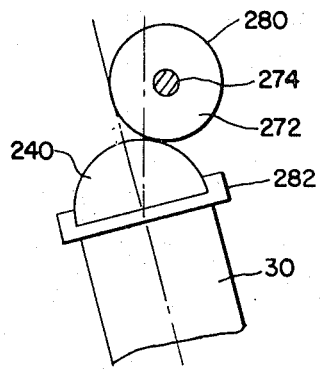
FIG. 21 is a schematic diagram, corresponding to a partial plan view, showing the step of FIG. 20.
Figure 23:
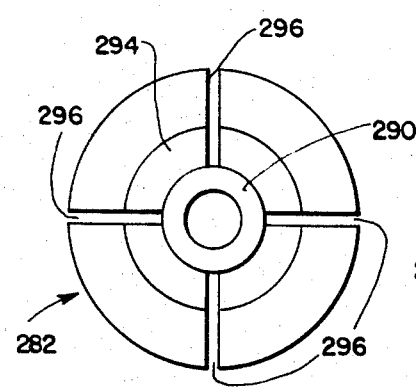
FIG. 23 is an end view of the collet of FIG. 22, taken from the left.
Figure 22:
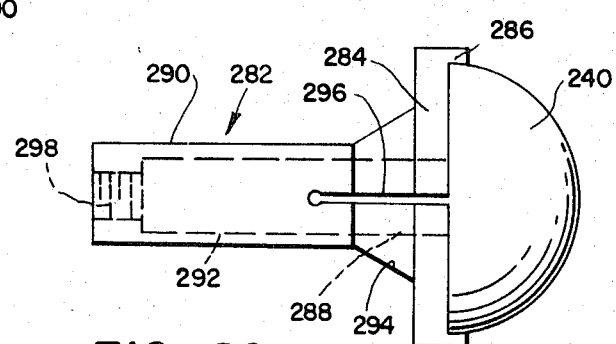
FIG. 22 is a side elevation view showing one embodiment of collet employed in the invention.

With regard to the head reamers of FIGS. 2 and 4, however, the cutting of the fenestrations is illustarted in FIGS. 20 and 21. A frusto-conical cutter 272 is mounted for rotation about a vertical shaft 274 and is driven by a drive unit 276. The cutter 272 has a flat upper surface 278 and a frusto-conical cutting face 280, having cutting teeth and extending at an angle of 60 degrees. The blank 240 is held in a special collet 282 which will most clearly be understood from FIGS. 22 and 23. The collet has an annular face plate, or head, 284 having a diameter substantially equal to the diameter of blank 240 so that blank 240 may be received against the flat surface of plate 284. Face plate 284 has an annular peripheral flange or lip 286 which engages the outer surface of blank 240 to retain it thereon. Face plate 284 has a central opening 288 and a rearwardly extending hollow shaft member 290, shaft 290 having a central passageway 292 aligned with central opening 288. Shaft 290 also has a tapered portion 294 extending inwardly from the back side of face plate 284. In order to enhance the resiliency of collet 282, four radial slots 296 extend inwardly from the outer peripheral edge of face plate 284 and thence along shaft 290 to a point beyond the tapered portion 294. The end of shaft 290 is provided with a threaded opening 298 to draw the collet therein.
into a tapered chuck of an index head 300 (see FIG. 20) whereby, due to the resiliency of the collet, it will be drawn tightly about blank 240 to securely hold it in place.

Referring to FIG. 20, it will be seen that collet 282 is mounted in index head 300, which has a tapered opening 302 and screw means 304 engaged with threaded opening 398 to draw the collet therein.

As will be observed from FIG. 20, index head 300 is tipped downwardly so that the axis of blank 240 extends at an angle of 30 degrees to the horizontal. Referring to FIG. 21, the index head is also tipped in a horizontal plane so that it will be approximately 15 degrees out of alignment with the vertical shaft 274 of cutter 272 when the cutter engages the outer surface of blank 240. It will be noted from FIG. 20 that cutter 272 is so positioned vertically that the flat upper surface 278 thereof will engage blank 240 slightly below the center of surface 240. Thus, an index head 300 is caused to move rectilinearly in the direction of arrow 306, bringing the outer surface of blank 240 into engagement with cutter 272, the openings 76 of the embodiment of FIG. 2 and the openings of the embodiment of FIG. 4 will be cut, upper surface 278 of cutter 272 forming the relatively straight edges of these openings. By tipping the blank downwardly at an angle of 30 degrees, a better cutting edge is provided more suited for relieving bone chips through the openings and providing a cutting edge which is more aggressive.

The blank 240 is now ready for the cutting of the radial teeth. This is accomplished in the manner shown in FIG. 24. A rotary frusto-conical cutter 308 is provided and has a conical cutting surface or face 310. Cutter 308 is mounted for rotation about a vertical shaft 312 and is driven by a drive unit 314. The blank 240 is now inverted with its inner surface facing outwardly and is mounted in a special collet 316.

Figure 24:
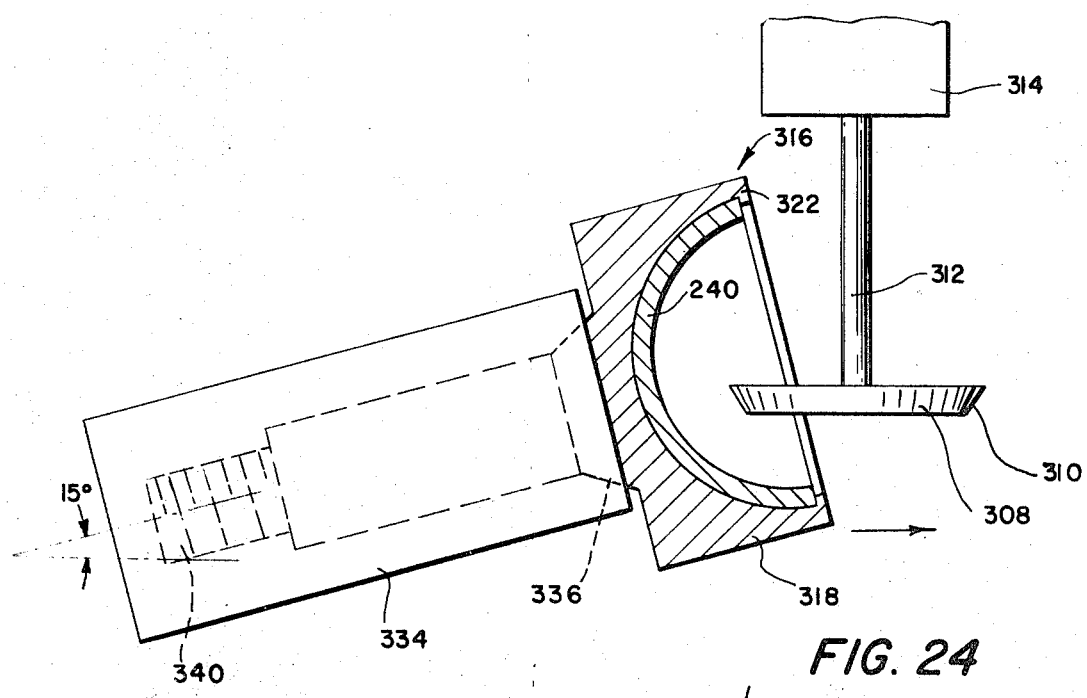
FIG. 24 is a schematic diagram, corresponding to an elevation view, illustrating a step of the invention.
Figure 25:
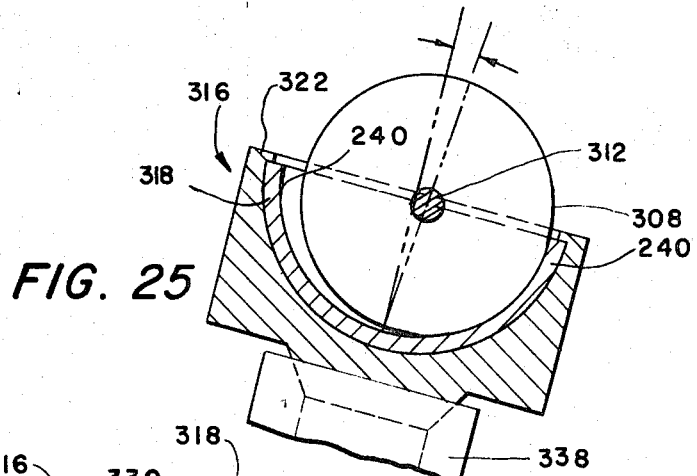
FIG. 25 is a schematic diagram, corresponding to a plan view, showing the step of FIG. 24.
Figure 26:
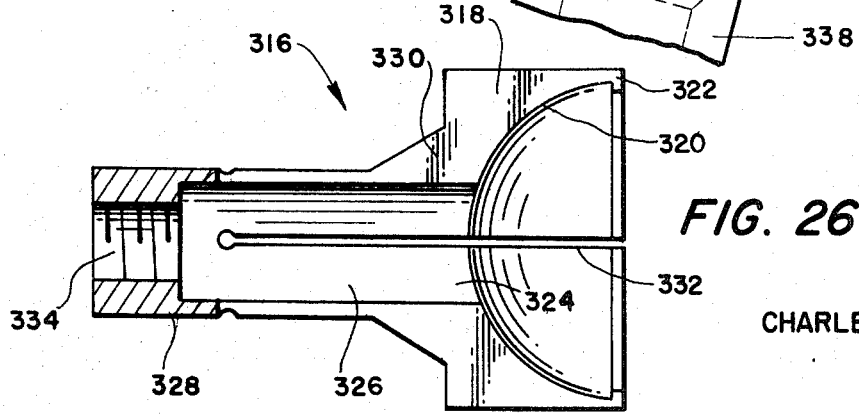
FIG. 26 is a side elevation view, taken in section, of another embodiment of collet employed in the method of the invention.
Figure 27:
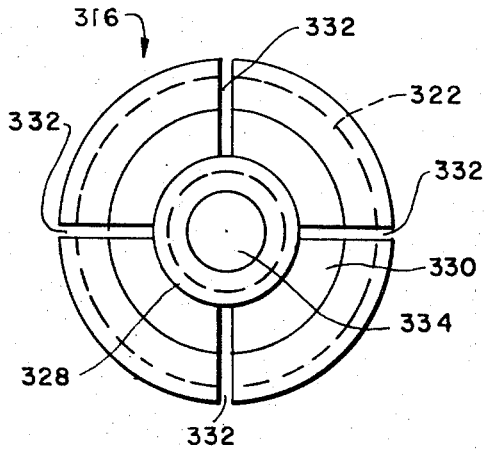
FIG. 27 is an end view of the collet of FIG. 26, viewed from the left.
Figure 28:
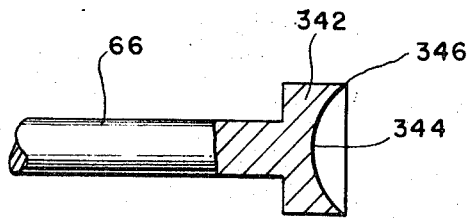
FIG. 28 is a view, partially broken away, showing a shaft employed in manufacturing a reamer according to the present invention.

The structure of special collet 316 will be best understood by reference to FIGS. 26 and 27. The collet includes an annular mounting head 318 having a spherical surface 320 adapted to receive the blank 240. The spherical surface 320 has an annular inwardly extending lip 322 which is adapted to grab only a portion of the edge of the blank 240, as shown in FIG. 24. The head 318 has a central opening 324 which is aligned with central passageway 326 of a shaft member 328 extending rearwardly from the rear face of head 318. The shaft has a tapered portion 330 which extends inwardly from the rear face of head 318 and which is adapted to be received in a tapered chuck or opening of an index head, whereby the collet will be drawn about the blank 240. To this end in order to enhance the resiliency of the collet, four radial slots 332 are provided extending inwardly from the outer peripheral edge of head 318 through lip 322 and along shaft 328 to a point beyond tapered section 330. These slots make the collet sufficiently resilient that the blank 240 may be snapped into place beneath lip 322 and, when the collect is drawn into a holder by engagement of a screw with a threaded end opening 334, will draw the collet tightly about the blank to secure it in position.

Returning to FIG. 24, it will be seen that collet 316 is received in a tapered opening 336 of an index head 338. Screw means 340 is provided within index head 338 to draw the collet into the tapered opening 336 for tightening the collet around blank 240. Index head 338 is tipped upwardly so that the axis of blank 240 is at substantially 15 degrees to the horizontal. In addition, the head is tipped in a horizontal plane so that the axis of blank 240 will be approximately 5 degrees out of alignment with shaft 312 when the edge of cutter 308 engages blank 240. It is to be observed that the diameter of cutter 308 is almost equal to the diameter of blank 240, being slightly less than the diameter thereof. For example, in the case of a blank 240 having an inside diameter of 2 inches, a cutter having an outside diameter of $1^{15}/_{16}$ inches would be employed. As is evident from FIG. 24, cutter 308 is positioned vertically so as to be in alignment with the center of blank 240, just clearing the lip 322. Index head 338 is mounted for reciprocation to bring index head 340 into engagement with cutter 308 so that cutter 308 can cut the radial grooves 75 which form radial teeth 70 (see FIGS. 2 and 2A). Because of the offset of shaft 312, the grooves 75 will be deepest at the peripheral edge of blank 240 and will be shallower as the groove approaches the apex of blank 240. After each tooth is thus cut, the index head is retracted; and the blank 240 is then indexed to the next radial tooth position by rotating the blank about its axis. The process is then repeated until all of the teeth are cut.

In the case of the power-driven head reamer of FIGS. 2 and 2A, the blank 240 is now ready to receive the shaft 66. The shaft has a head portion 342 provided with a concave end surface 344 which has a circular peripheral edge 346. It is now necessary to center edge 346 concentrically with the axis of blank 240 and weld it to the outer surface thereof.

Figure 29:
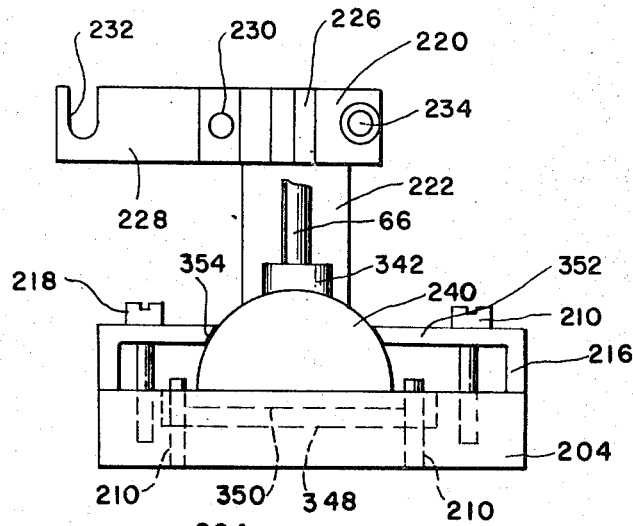
FIG. 29 is an elevation view showing an additional embodiment of welding rig.
Figure 30:
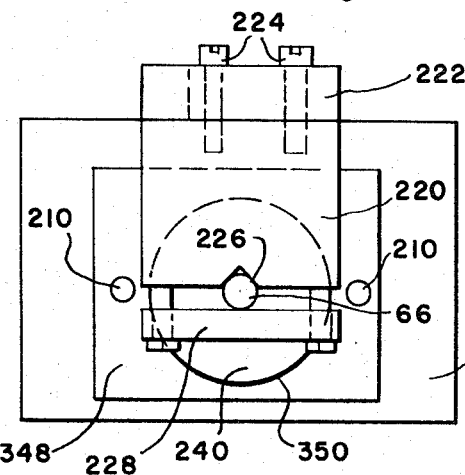
FIG. 30 is a plan view of the welding rig of FIG. 29.

This is accomplished by employing a special welding rig, as shown in FIGS. 29 and 30. It will be noted that the welding rig is essentially the same as the welding rig of FIGS. 15 and 16; and, accordingly, the same reference numerals will be employed to represent the same parts, which, it is to be understood, will operate in the same manner as was described with respect to FIGS. 15 and 16. For the purpose of securing shaft 66 to blank 240, a different base plate 348 is provided, having a circular recess 350 which is dimensioned to snugly receive the peripheral edge of blank 240 faced downwardly, as shown in FIG. 29. A special guide plate 352 having a central opening 354, dimensioned and shaped to snugly engage the outer surface of blank 240 as shown, is mounted on base 204. The head 342 of shaft 66 is placed on the apex of the outer surface of blank 240 with the shaft 66 received within V-groove 226 and clamped in this position by closing the clamping bar 228, as shown in FIG. 30. When in this position, head 342 will be concentric with the axis of blank 240 and is welded thereon by rotating the base 204 while applying a welding tool thereto.

In the case of the eccentric handle reamers of FIGS. 3 and 4, a special welding rig as shown in FIGS. 31–35 is employed. Referring to FIG. 31, it will be noted that the welding rig includes a base plate 356 having a first pedestal 358 mounted adjacent one end thereof, a pedestal 360 mounted adjacent the other end thereof, and a central pedestal 362 mounted midway of pedestals 358 and 360. As described previously, the connecting portion 120 of the embodiment of FIG. 3 has a larger angular end portion 121 than the angular end portion 125 of the connecting portion 124 of the embodiment of FIG. 4. It is for this reason that pedestal 360 has a top surface at a slightly higher elevation than pedestal 358. Pedestal 358 has a jig plate 364 mounted on its top surface, being retained thereon by upstanding pins 365 received through holes in the plate. Plate 364 is also provided with an arcuate opening 366 for receiving blank 240, the arc having the same radius as the outer diameter of blank 240. In like manner, a plate 368 is provided on pedestal 360, being retained thereon by pins 369 extending through the plate, and has an arcuate opening 370 having the same arcuate diameter as the outer diameter of blank 240. In order to securely clamp blank 240 in either opening 366 or opening 370 a pair of clamps are provided. One of these clamps is formed by providing an angle bracket 372 having an arm 374 extending over recess 366. A thumb screw 376 extends through a threaded hole provided in angle bracket arm 374 to engage the top of a blank 240 placed therein. A soft resilient pad may be placed between the end of screw 376 and the blank 240 in order to protect the surface thereof. Similarly, an angle bracket 376 is provided at the other end of base 356 and has an arm 380 extending over recess 370. A thumb screw 382 extends through a threaded hole in arm 380 and is adapted to engage the outer surface of a blank 240 placed within recess 370. Again, a resilient pad may be employed to protect the surface of the blank.

The central pedestal 362 is adapted to receive and clamp the connecting portion of a handle to be eccentrically secured to the periphery of blank 240. To this end, pedestal 362 has a V-groove 384 in its upper surface aligned with the centers of recesses 366 and 370. A clamping plate 386 has a V-groove 388 positioned directly above V-groove 384 also in alignment with the centers of recesses 366 and 370. Plate 386 has a smooth hole 390 to receive a thumb screw 392 which is engaged in a threaded hole 394 provided in pedestal 362. Plate 386 is also provided with a flange 396 which rests upon the upper surface of pedestal 362. By this means, clamping plate 386 is tightly engaged against the round shaft of a handle connecting portion which is clamped between the V-grooves 384 and 388. It is to be noted that in the plan view of FIG. 32 the clamping means referred to above have been omitted so that a clearer view may be had of the pedestals and base.

Referring now to FIG. 34, the manner in which the welding rig of FIGS. 31, 32 and 33 is employed for welding a connecting portion to the outer surface of the femoral head reamer of FIG. 4 is shown. The head 126 is placed on pedestal 358 being held from lateral movement by the edges of recess 366. Clamping screw 376 (which is omitted from this figure for the sake of clarity) also securely holds head 126 in place. The angular end 125 of connecting portion 124 is laid against the outer surface of head 126. The round shank portion 398 of connection portion 124 is securely clamped in V-groove 384 as already described. End portion 125 is then welded to the outer surface of head 126.

In FIG. 35, the manner in which connecting portion 120 is secured to head 110 of the embodiment of FIG. 3 is illustrated. Head 110 is received in recess 370 and secured from movement by the edges of recess 370 and by the action of clamping screw 382. It is to be noted that clamping screw 382 has been omitted from this figure for the sake of clarity. The connecting member 120 is clamped in V-groove 384 with its round shank portion 400 being held snugly therein by means of clamping plate 386 as previously described. The angular end portion 121 of connecting portion 120 is now in abutting relation with the peripheral edge of head 110 and is welded thereto.

It is to be understood with reference to the methods described that various additional steps may be provided where necessary. For example, if burrs or rough edges are produced by any of the operations mentioned above, deburring steps could be added. The teeth may be cut in two stages with rough milling followed by finish milling. The various teeth and recesses may be subjected to further finishing by hand filing steps when required. The reamers may be also subjected to such polishing and finishing steps as are deemed necessary.

While preferred embodiments of the invention have been shown and described it will be apparent to those skilled in the art that changes can be made without departing from the principles and spirit of the invention, the scope of which is defined in the appended claims.

The invention claimed is:

1. A method of providing aggressive central cutting teeth adjacent the apex of a hip head reamer cutting head having a dome-shaped, substantially spherical inner surface and being in the form of a dome-shaped cup, comprising:

providing a rotary cutter mounted for rotation about a vertical axis and having a flat upper surface and a frusto-conical cutting face tapering inwardly from said upper surface, positioning said dome-shaped cup with the outer surface of said cup facing said rotary cutter, said cup being tipped downwardly at an angle of substantially 30 degrees, and rectilinearly moving said cup into engagement with said cutter whereby said cutter cuts openings through said dome-shaped surface adjacent the apex of said cup with said upper surface of said cutter providing a substantially flat radial wall and said frusto-conical cutting face providing an arcuate wall, said flat and arcuate walls forming a cut into said surface, said flat radial wall providing one of said aggressive cutting teeth.

2. A method as recited in claim 1, wherein the axis of said cup is offset from the vertical axis of said cutter and the point of intersection of the axis of said cup and said outer surface lies substantially in the horizontal plane of said upper surface of said cutter.

3. A method as recited in claim 2, wherein the axis of said cup forms an angle of substantiially 15 degrees with a line extending through the vertical axis of said rotary cutter when said rotary cutter comes into engagement with said outer surface of said cup.

4. A method of forming an acetabular reamer having a plurality of recesses adjacent to the apex of a dome-shaped, spherical surface, said recesses providing aggressive radial cutting teeth, a plurality of radial teeth extending inwardly from the periphery of said dome-shaped surface, and grooves extending across said teeth at an angle, comprising: providing a solid cylindrical blank; milling a spherical surface on one end of said blank; providing a boss on the other end of said blank; milling said central recesses with a rotary cutter by moving said spherical surface of said blank into engagement with said cutter; cutting said radial teeth by moving said blank into engagement with a second rotary cutter and rotating said blank in an arc while in engagement with said second rotary cutter; cutting said grooves by moving said blank into engagement with a rotating saw blade and moving said blank in an arc while in engagement with said saw blade; securing the threaded end of a shaft in said threaded boss; and welding said shaft to said threaded boss.

5. A method of forming radial cutting teeth on the inner spherical surface of a dome-shaped blank, comprising: mounting said blank with its inner surface facing a rotary cutter rotating about a vertical axis; tipping said blank upwardly at an angle of substantially 15 degrees with the horizontal; and moving said blank rectilinearly to bring said inner surface of said blank into engagement with said cutter.

6. A method as recited in claim 5, wherein said rotary cutter has a frusto-conical cutting face disposed at an angle of substantially 50 degrees to the horizontal and the diameter of said cutter is slightly smaller than the diameter of said blank.

7. A method as recited in claim 5, further comprising the steps of rotating said blank through a small angle after each radial tooth is cut by the cutter and again reciprocating said blank into engagement with said rotary cutter to cut the next adjacent tooth.

8. A method of manufacturing a head reamer having an inner substantially spherical, dome-shaped surface provided with central openings adjacent the apex of said surface forming substantially radial cutting edges and a plurality of peripheral radial teeth extending inwardly from the outer periphery of said surface, comprising: providing a circular blank; cold-forming said blank in a die press into a spherical cup-shape; milling said openings through the outer surface of said blank by moving said cup-shaped blank into engagement with a rotary cutter having a flat upper surface; and cutting said radial teeth by facing the inner surface of said cup-shaped body toward a rotary cutter and reciprocating said blank into engagement with said rotary cutter with said blank tipped upwardly at a small angle.

9. A method as recited in claim 8, further comprising the step of providing a shaft having an enlarged head having a concave end surface, placing the edge of said end surface of said head of said shaft upon the outer surface of said cup-shaped blank about the central axis thereof, and welding said head of said shaft to the outer surface of said cup-shaped blank.

10. A method as recited in claim 8, further comprising the steps of providing a handle for said reamer, said handle having a connecting portion with an end portion tipped upwardly at an angle, and welding the end portion of said connecting portion to the peripheral edge of said cup-shaped body.

11. A method of forming an acetabular reamer having a plurality of recesses adjacent to the apex of a dome-shaped, spherical surface, said recesses providing aggressive radial cutting teeth, a plurality of radial teeth extending inwardly from the periphery of said dome-shaped surface, and grooves extending across said teeth at an angle, comprising: providing a solid cylindrical blank; milling a spherical surface on one end of said blank; providing a boss on the other end of said blank; milling said central recesses with a rotary cutter by moving said spherical surface of said blank into engagement with said cutter; cutting said radial teeth by moving said blank into engagement with a second rotary cutter and rotating said blank in an arc while in engagement with said second rotary cutter; and cutting said grooves by moving said blank into engagement with a rotating saw blade and moving said blank in an arc while in engagement with said saw blade.

References Cited

UNITED STATES PATENTS

| | | | |
|---|---|---|---|
| 1,536,736 | 5/1925 | Vokal et al. | 76—108X |
| 1,882,692 | 10/1932 | Albertson | 76—101 |
| 3,003,370 | 10/1961 | Coulter, Jr. | 76—108 |

GRANVILLE Y. CUSTER, JR., Primary Examiner